(12) United States Patent
Olsson (10) Patent No.: US 11,854,161 B2
(45) Date of Patent: Dec. 26, 2023

(54) NON-UNIFORMITY CORRECTION TECHNIQUES USING SHIFTED IMAGE FRAMES

(71) Applicant: FLIR Systems AB, Täby (SE)

(72) Inventor: Stefan F. Olsson, Stockholm (SE)

(73) Assignee: FLIR Systems AB, Taby (SE)

( * ) Notice: Subject to any disclaimer, the term of this patent is extended or adjusted under 35 U.S.C. 154(b) by 290 days.

(21) Appl. No.: 17/214,023

(22) Filed: Mar. 26, 2021

(65) Prior Publication Data

US 2021/0217142 A1 Jul. 15, 2021

Related U.S. Application Data

(63) Continuation of application No. PCT/US2019/052788, filed on Sep. 24, 2019.

(60) Provisional application No. 62/738,855, filed on Sep. 28, 2018.

(51) Int. Cl.
*G06K 9/00* (2022.01)
*G06T 5/00* (2006.01)
*G06T 5/50* (2006.01)

(52) U.S. Cl.
CPC ............... *G06T 5/002* (2013.01); *G06T 5/50* (2013.01); *G06T 2207/10016* (2013.01); *G06T 2207/20182* (2013.01)

(58) Field of Classification Search
CPC . G06T 5/002; G06T 5/50; G06T 2207/10016; G06T 2207/20182; G06T 5/005; G06T 5/006; G06T 5/007; G06T 5/10; G06T 5/20; G06T 5/40; G06T 2207/20224; G06T 2207/10048; G06T 2207/10024; G06T 7/246; G06T 7/32; G06T 7/38; G06T 2207/10144; H04N 5/145; H04N 25/63; H04N 25/674; H04N 5/33; H04N 25/67; H04N 25/671; H04N 25/75; H04N 25/616; H04N 25/677; H04N 25/76; H04N 23/741; H04N 23/66; H04N 23/70; H04N 25/77; H04N 25/771; H04N 25/65
See application file for complete search history.

(56) References Cited

U.S. PATENT DOCUMENTS

| 9,723,227 B2 | 8/2017 | Hogasten et al. | |
| 9,832,401 B1* | 11/2017 | Donovan, Jr. | ......... H04N 5/772 |
| 2003/0198400 A1* | 10/2003 | Alderson | ............... H04N 25/63 |
| | | | 348/E5.081 |
| 2009/0230293 A1 | 9/2009 | Hogasten et al. | |
| 2017/0372453 A1 | 12/2017 | Foster | |

* cited by examiner

*Primary Examiner* — Alex Kok S Liew
(74) *Attorney, Agent, or Firm* — Haynes and Boone, LLP (57) ABSTRACT

Various techniques are provided to reduce noise in captured images using frame-to-frame shifts of scene information. In one example, a system includes an imager and a processor. The imager is configured to capture a plurality of image frames comprising scene information. The image frames exhibit frame-to-frame shifts of the scene information caused by a motion pattern associated with the imager. The processor is configured to distinguish noise in the image frames from the frame-to-frame shifts of the scene information. The processor is also configured to update non-uniformity correction terms to reduce the noise. Additional systems and methods are also provided.

20 Claims, 9 Drawing Sheets

NON-UNIFORMITY CORRECTION TECHNIQUES USING SHIFTED IMAGE FRAMES

CROSS-REFERENCE TO RELATED APPLICATIONS

This application is a continuation of International Patent Application No. PCT/US2019/052788 filed Sep. 24, 2019 and entitled "NON-UNIFORMITY CORRECTION TECHNIQUES USING SHIFTED IMAGE FRAMES", which is incorporated herein by reference in its entirety.

International Patent Application No. PCT/US2019/052788 claims the benefit of and priority to U.S. Provisional Patent Application No. 62/738,855 filed Sep. 28, 2018 and entitled "NON-UNIFORMITY CORRECTION TECHNIQUES USING SHIFTED IMAGE FRAMES" which is hereby incorporated by reference in its entirety.

TECHNICAL FIELD

The present invention relates generally to imaging devices and more particularly, for example, to noise removal for infrared imaging devices.

BACKGROUND

Infrared imaging devices (e.g., thermal imagers) often suffer from various types of noise, such as high spatial frequency fixed pattern noise (FPN). Some FPN may be correlated to rows and/or columns of infrared sensors. For example, FPN noise that appears as column noise may be caused by variations in column amplifiers and include a 1/f component. Such column noise can inhibit the ability to distinguish between desired vertical features of a scene and vertical FPN. Other FPN may be spatially uncorrelated, such as noise caused by pixel to pixel signal drift which may also include a 1/f component.

One approach to removing FPN relies on an internal or external shutter that is selectively placed in front of infrared sensors of an infrared imaging device to provide a substantially uniform scene. The infrared sensors may be calibrated based on image frames captured of the substantially uniform scene while the shutter is positioned in front of the infrared sensors. Unfortunately, such a shutter may be prone to mechanical failure and potential non-uniformities (e.g., due to changes in temperature or other factors) which render it difficult to implement. Moreover, in applications where infrared imaging devices with small form factors may be desired, a shutter can increase the size and cost of such devices.

Another approach involves capturing image frames without a shutter and capturing intentionally blurred image frames. As a result, fine details of the scene that might be otherwise be interpreted as noise may be obscured while noise remaining in the blurred image frames may be identified and removed. Advantageously, such an approach does not require the use of a shutter, but may involve the provisioning and utilisation of various components to perform the intentional blurring.

SUMMARY

Improved techniques are provided to reduce noise in captured images using frame-to-frame shifts of scene information. In one embodiment, a method includes moving an imager of an imaging system in accordance with a motion pattern; capturing, by the imager, a plurality of image frames comprising scene information, wherein the image frames exhibit frame-to-frame shifts of the scene information caused by the motion pattern; processing the image frames to distinguish noise in the image frames from the frame-to-frame shifts of the scene information; and updating non-uniformity correction terms to reduce the noise.

In another embodiment, a system includes an imager configured to capture a plurality of image frames comprising scene information, wherein the image frames exhibit frame-to-frame shifts of the scene information caused by a motion pattern associated with the imager; and a processor configured to: distinguish noise in the image frames from the frame-to-frame shifts of the scene information, and update non-uniformity correction terms to reduce the noise.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

In accordance with various embodiments disclosed herein, techniques are provided to trigger and perform scene-based non-uniformity correction (SBNUC) processes utilizing image frames comprising scene information that has shifted within the image frames (e.g., shifted images) by a known amount. In some embodiments, such shifts may be caused by the capturing of image frames by an imaging system undergoing one or more known controlled motion patterns (e.g., movements) by a pan/tilt platform to which the imaging system is attached. In other embodiments, such shifts may be caused by the capturing of image frames by an imaging system undergoing one or more other motion patterns, such as movements by a user while the imaging system is held by and/or otherwise manipulated by the user. In yet other embodiments, any combination of pan/tilt platform motion patterns and other motion patterns may be utilized.

In all of these cases, the amount of the shift may be known, for example, from a predetermined known controlled motion pattern of the pan/tilt platform and/or a detected motion pattern of the imaging system. Advantageously, as scene information shifts from image frame to image frame (e.g., as a result of the various motion patterns discussed herein), certain noise components such as fixed pattern noise (FPN) remains static from frame-to-frame. Moreover, because the motion patterns are known, the amount of image shift can be predicted. Thus, image content (e.g., scene information) that shifts in a manner consistent with known motion patterns can be distinguished from noise content (e.g., FPN) that may remain static or does not otherwise conform to the predicted shift. As a result, noise can be identified and non-uniformity correction terms may be updated to compensate for (e.g., remove) the noise.

In some embodiments, the SBNUC processing may be performed in a manner that is not apparent to a user such that the user may continue to receive, view, and/or otherwise utilize captured images while the SBNUC processing is performed. This relieves the user from the task of proactively triggering non-uniformity correction processing.

Figure 1:
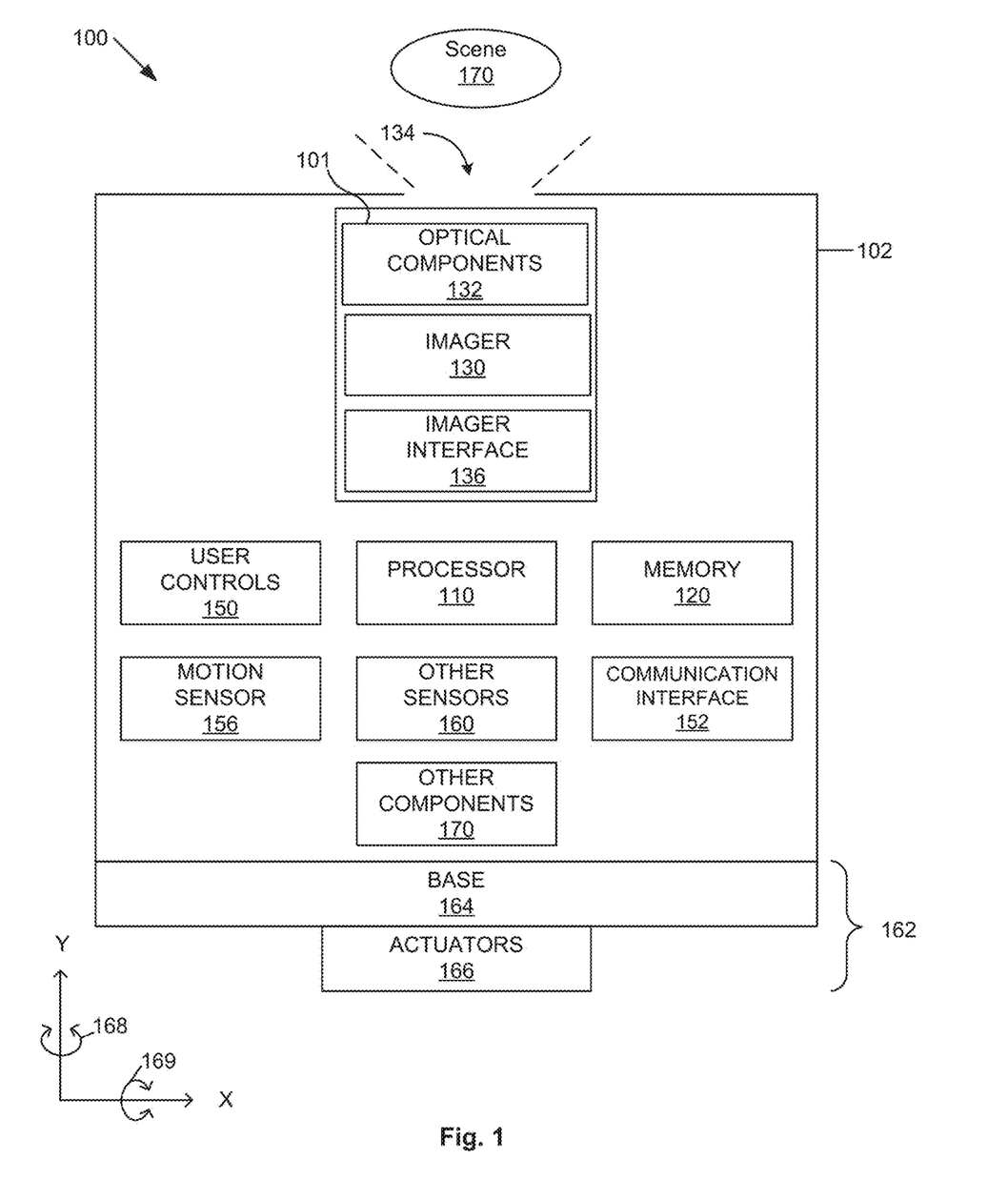
FIG. 1 illustrates a block diagram of an imaging system in accordance with an embodiment of the disclosure.

Turning now to the drawings, FIG. 1 illustrates a block diagram of an imaging system 100 in accordance with an embodiment of the disclosure. Imaging system 100 may include a camera 101, a housing 102, a processor 110, a memory 120, user controls 150, a communication interface 152, a motion sensor 156, other sensors 160, a pan/tilt platform 162, and other components 170.

Camera 101 may be used to capture and process image frames (e.g., images) of a scene 170 (e.g., a field of view). In various embodiments, camera component 101 may be implemented as a visible image camera, an infrared camera (e.g., thermal camera), and/or other types of cameras as appropriate. As shown, camera 101 may include an imager 130, optical components 132, and an image interface 136. Optical components 132 (e.g., one or more lenses) receive visible light and/or infrared radiation through an aperture 134 and pass the light/radiation to imager 130. Imager 130 may include an array of sensors (e.g., any type visible light, infrared, or other types of detectors) for capturing image frames of scene 170. The sensors of imager 130 provide for representing (e.g., converting) a captured image frames of scene 170 as digital data (e.g., via an analog-to-digital converter). Image interface 136 provides the data to processor 110 which may be used to process the image frames, store the original and/or processed images in memory 120, and/or retrieve stored image frames from memory 120.

In some embodiments, imager 130 may be implemented with extra pixels to ensure desired portions of scene 170 remain within captured image frames as imaging system 100 is moved in accordance with controlled motion patterns and detected motion patterns.

Processor 110 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or any other appropriate combinations of processing device and/or memory to execute instructions to perform any of the various operations described herein. Processor 110 is configured to interface and communicate with the various components illustrated in FIG. 1 to perform method and processing steps as described herein. In various embodiments, processing operations and/or instructions may be integrated in software and/or hardware as part of processor 110, or code (e.g., software or configuration data) which may be stored in memory 120. In some embodiments, memory 120 may include a machine-readable memory configured to store such processing operations and/or instructions in a non-transitory manner for execution by processor 110.

Memory 120 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, fixed memory, removable memory, and/or other types of memory.

Figure 2:
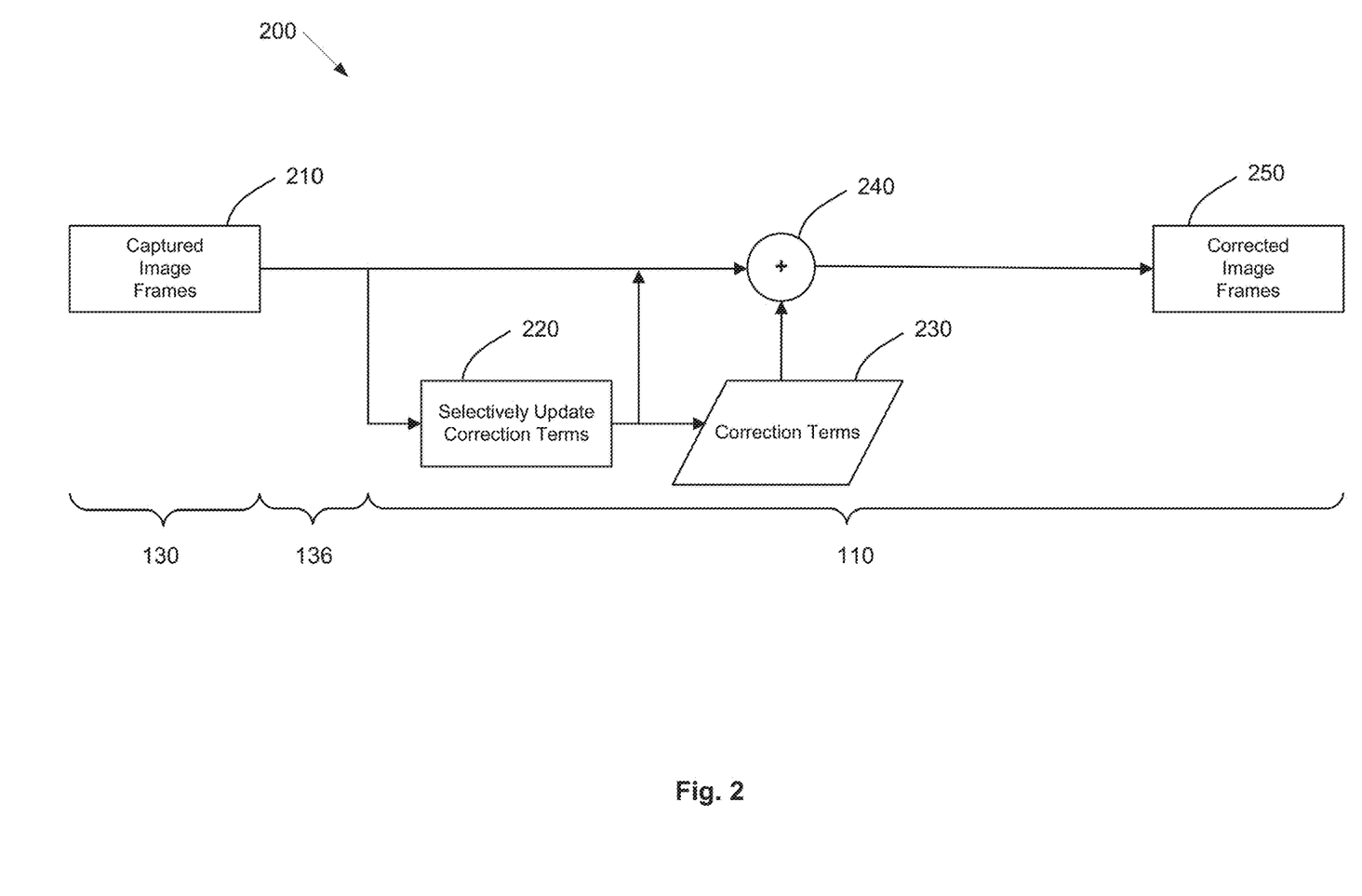
FIG. 2 illustrates an image processing pipeline configured to apply correction terms in accordance with an embodiment of the disclosure.

User controls 150 may include any desired type of user input and/or interface device having one or more user actuated components, such as one or more buttons (e.g., as shown in FIGS. 1 and 2), slide bars, rotatable knobs, and/or other types of controls that are configured to generate one or more user actuated input control signals. Processor 110 may be configured to sense control input signals from user controls 150 and respond to sensed control input signals received therefrom.

Imaging system 100 may include one or more motion sensors 156 such as accelerometers, vibration sensors, gyroscopes and/or others which may be used to detect motion of imaging system 100 corresponding to a motion pattern. Imaging system 100 may include various types of other sensors 160 including, for example, microphones (e.g., microphones 18 shown in FIGS. 1 and 2), navigation sensors (e.g., global positioning system (GPS) sensors), and/or other sensors as appropriate.

Processor 110 may be configured to receive and pass image frames from camera component 101, additional data from sensors 160, and control signal information from user controls 150 to one or more external devices through communication interface 152 (e.g., through wired and/or wireless communications). In this regard, communication interface 152 may be implemented to provide wired communication over a cable and/or wireless communication over an antenna. For example, communication interface 152 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components configured for communication with a network. As such, communication interface 152 may include an antenna coupled thereto for wireless communication purposes. In other embodiments, the communication interface 152 may be configured to interface with a DSL (e.g., Digital Subscriber Line) modem, a PSTN (Public Switched Telephone Network) modem, an Ethernet device, and/or various other types of wired and/or wireless network communication devices configured for communication with a network.

In some embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) configured to communicate with other communication networks, such as the Internet. As such, in various embodiments, imaging system 100 and/or its individual associated components may be associated with a particular network link such as for example a URL (Uniform Resource Locator), an IP (Internet Protocol) address, and/or a mobile phone number.

Pan/tilt platform 162 may include a base 164 and one or more actuators 166 (e.g., servos and/or other appropriate drive mechanisms). Base 164 provides a mounting surface for imaging system 100 and may be moved by actuators 166 under the control of processor 110 in accordance with various controlled motion patterns.

For example, processor 110 may provide appropriate control signals to cause actuators 166 to rotate imaging system 100 about a Y axis in the directions denoted by arrows 168, thus causing camera 101 to pan relative to scene 170. As another example, processor 110 may provide appropriate control signals to cause actuators 166 to rotate imaging system 100 about an X axis in the directions denoted by arrows 169, thus causing camera 101 to tilt relative to scene 170. In various embodiments, such panning and tilting may be performed separately or simultaneously as desired and while camera 101 captures image frames of scene 170.

In some embodiments, imaging system 100 may be implemented as a mobile device, such as a portable camera that may be handheld or otherwise manipulated by a user. In such cases, pan/tilt platform 162 may be omitted and housing 102 may be instead grasped by a user. In this regard, one or more motion sensors 156 may be used to detect a motion pattern of imaging system 100 and thus be used to predict the amount of frame-to-frame shift caused by user movement of imaging system 100.

Imaging system 100 may include various other components 170 such as speakers, displays, visual indicators (e.g., recording indicators), vibration actuators, a battery or other power supply (e.g., rechargeable or otherwise), and/or additional components as appropriate for particular implementations.

Figure 3:
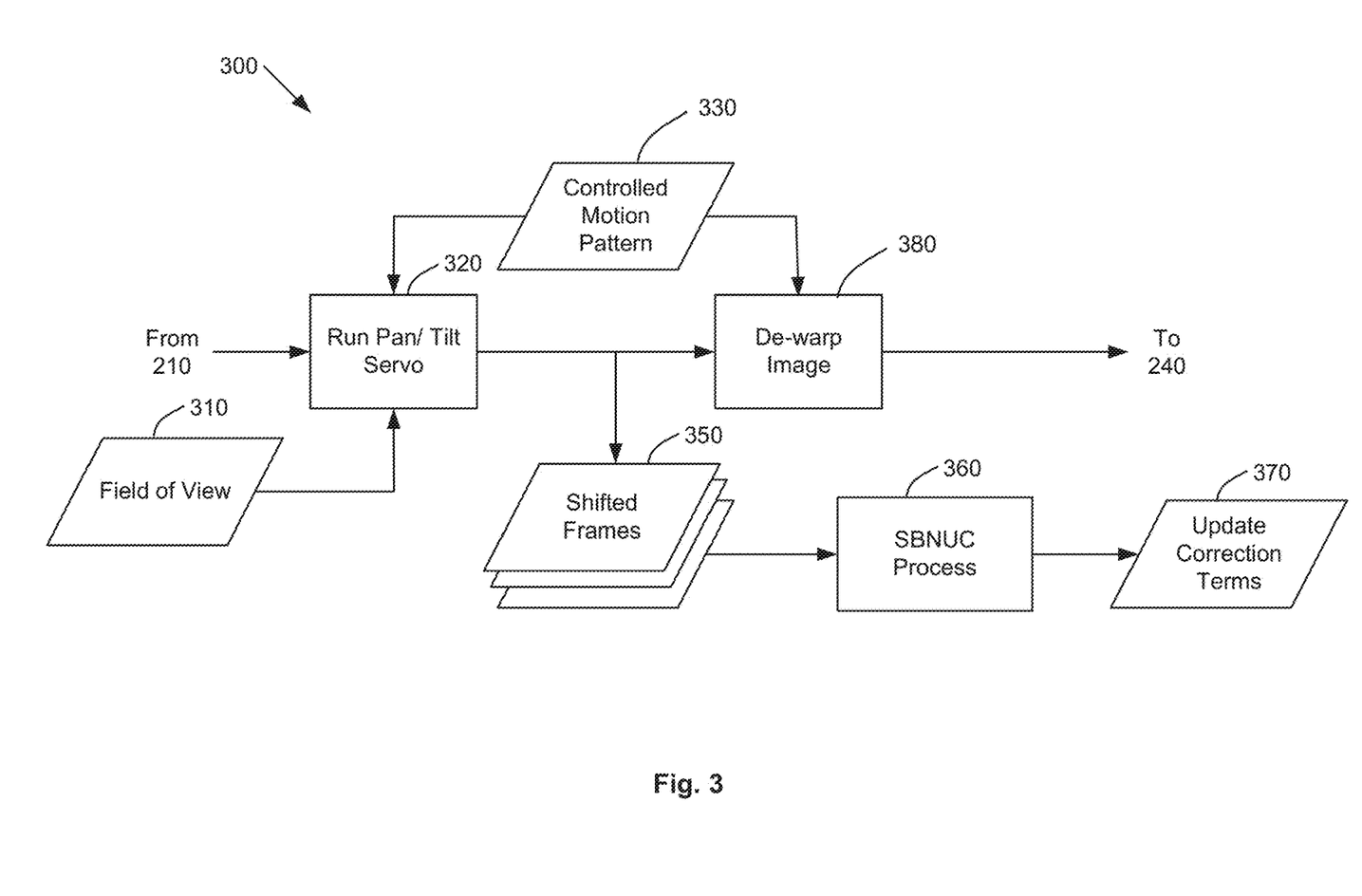
FIG. 3 illustrates an image processing pipeline configured to update correction terms using a pan/tilt platform in accordance with an embodiment of the disclosure.
Figure 4:
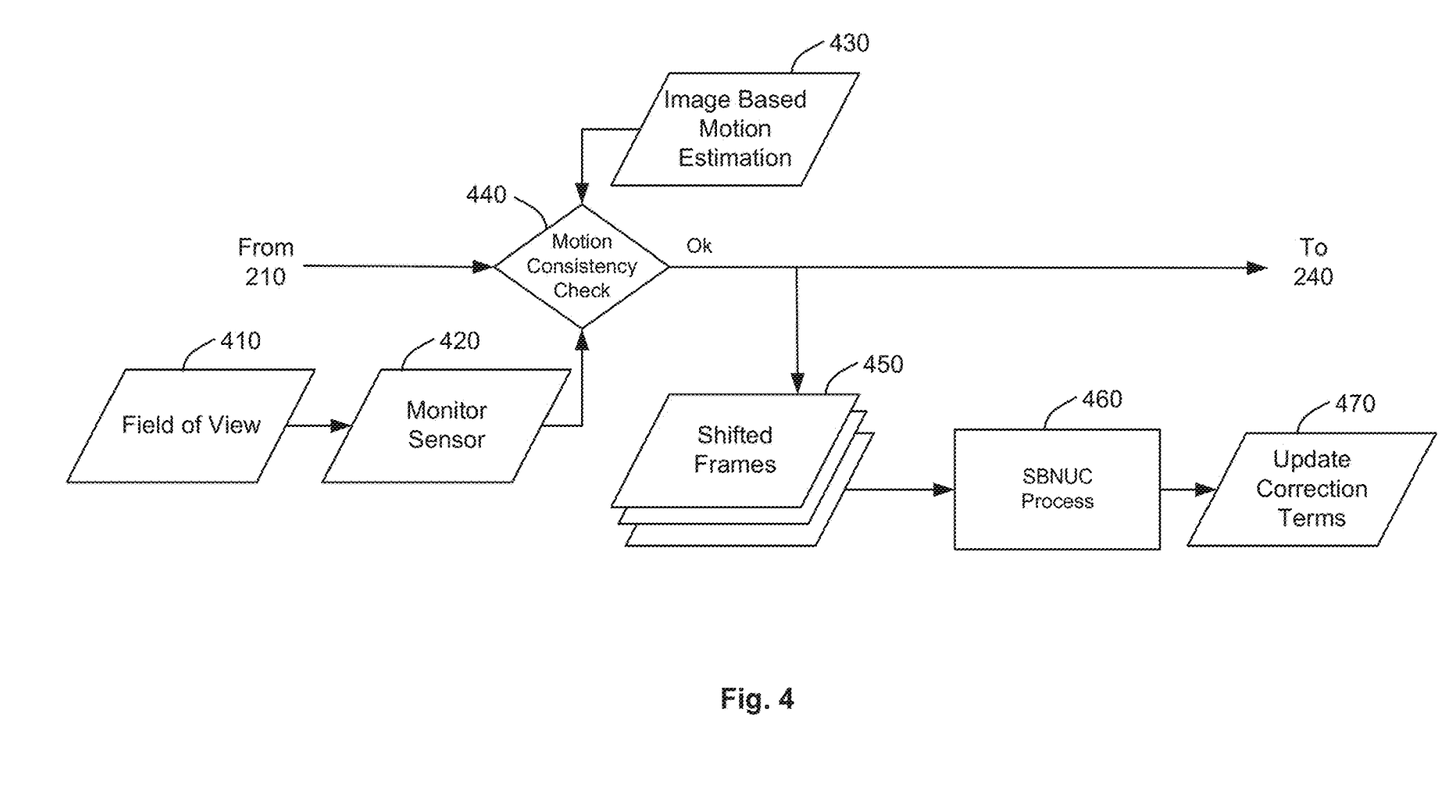
FIG. 4 illustrates an image processing pipeline configured to update correction terms using a motion sensor in accordance with an embodiment of the disclosure.

FIGS. 2-4 illustrate various portions of an image processing pipeline that may be used to update and apply correction terms in accordance with embodiments of the disclosure. In this regard, FIG. 2 illustrates an overall image processing pipeline 200 configured to apply correction terms 230, FIG. 3 illustrates a portion 300 of image processing pipeline 200 configured to update correction terms 230 using pan/tilt platform 162, and FIG. 4 illustrates a portion 400 of image processing pipeline 200 configured to update correction terms 230 using a motion sensor, in accordance with embodiments of the disclosure.

Turning now to FIG. 2, image frames 210 captured by imager 130 are provided to processor 110 through image interface 136. Image frames 210 may include a series of image frames captured of scene 170 before, during, and/or after movement of pan/tilt platform 162 and/or movement detected by motion sensor 156 in accordance with various motion patterns.

Figure 6:
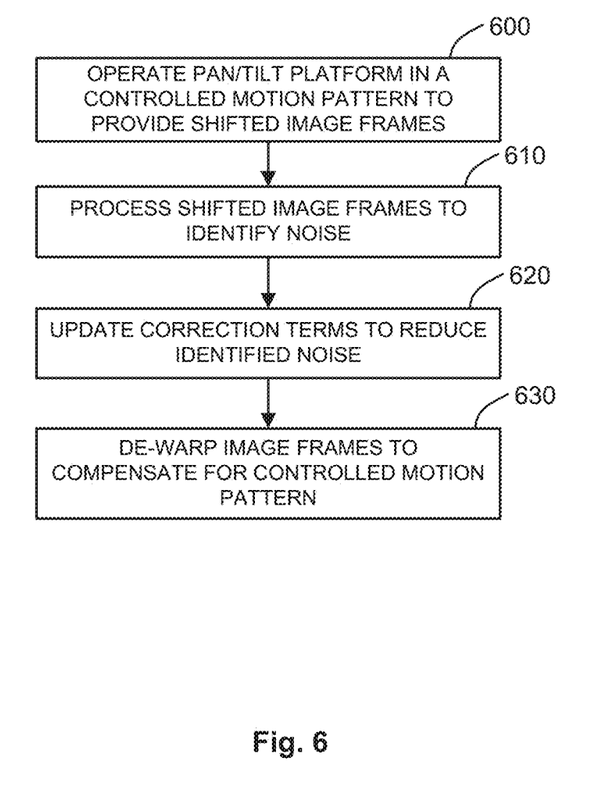
FIG. 6 illustrates a process of updating correction terms using a pan/tilt platform in accordance with an embodiment of the disclosure.

In block 220, processor 110 selectively updates one or more non-uniformity correction terms 230 according to FIGS. 3, 4, 6, and/or 7 as further discussed herein. In various embodiments, correction terms 230 may be offset values applied to one or more pixels, rows, and/or columns of image frames 210 to reduce the appearance of noise in image frames 210. As shown, in some embodiments, block 220 may be bypassed when it is not desired to update the correction terms 230 (e.g., when pan/tilt platform 162 is not operating and/or when motion is not detected by motion sensor 156).

In block 240, processor 110 applies the correction terms 230 to the captured image frames 210 to provide corrected image frames 250 with reduced noise. In various embodiments, corrected image frames 250 may undergo further processing by processor 110, be stored in memory 120, be transmitted to other devices through communication interface 152, and/or be presented to a user on a display provided by other components 170.

Although block 220 is illustrated as being performed on image frames 210 before correction terms 230 are applied, other embodiments are also contemplated. For example, block 220 may instead be performed on corrected image frames 250 such that the processing performed by block 220 includes the benefit of previously determined correction terms 230.

FIG. 3 illustrates a portion 300 of image processing pipeline 200 which may be provided in block 220 of FIG. 1 to update correction terms 230 using pan/tilt platform 162 in accordance with an embodiment of the disclosure. Processor 110 provides control signals to operate actuators 166 (block 320) of pan/tilt platform 162 to move imaging system 100 in a controlled motion pattern (block 330) corresponding to movement in the directions of arrows 168 about a Y axis and/or movement in the direction of arrows 169 about an X axis as discussed (e.g., in one or more dimensions). In various embodiments, the controlled motion pattern may be predetermined or generated in realtime.

In some embodiments, the controlled motion pattern may be selected such that it is limited to a particular field of view (block 310) of scene 170. For example, processor 110 may select the controlled motion pattern such that a subset of scene 170 (e.g., scene information comprising less than an entirety of scene 170) is present in all image frames 210 captured while the controlled motion pattern is performed. As a result, frame-to-frame shifts may be determined with reference to the subset of the scene 170.

While the controlled motion pattern is performed (block 330), imager 130 continues to capture image frames 210. As a result, the image frames 210 may exhibit shifts relative to each other (e.g., also referred to as shifted image frames). For example, due to the movement of imaging system 100 by pan/tilt platform 162, the same scene information may be captured at different pixel locations in different image frames 210. If processor 110 determines that shifted image frames have been captured, then processor 110 may be triggered to perform a SBNUC process (block 360) in response to such determination. In this regard, processor 110 utilizes the shifted image frames (block 350) in a SBNUC process (block 360) to update correction terms 230 (block 370) to compensate for the noise identified in block 360.

Figure 8:
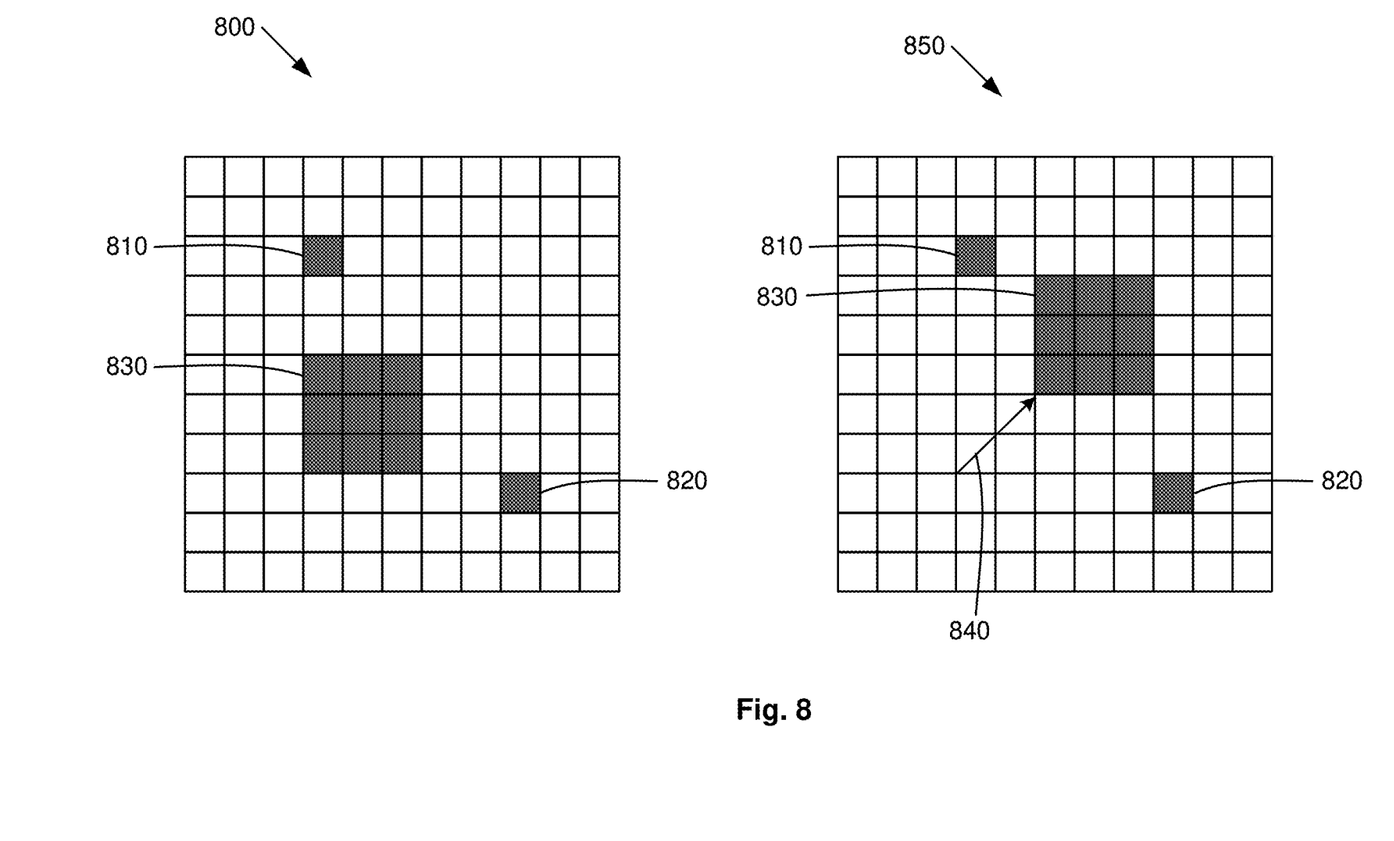
FIG. 8 illustrates example image frames in accordance with an embodiment of the disclosure.

For example, FIG. 8 illustrates example shifted image frames 800 and 850 in accordance with an embodiment of the disclosure. Although shifted image frames 800 and 850 are provided as 11 by 11 pixel images, it will be understood that this is only for purposes of example and that larger or smaller numbers of pixels may be provided in various embodiments.

Shifted image frames 800 and 850 are captured at different times during the controlled motion pattern performed in block 320. As shown, both shifted image frames 800 and 850 include various features 810, 820, and 830. Upon review, it will be appreciated that features 810 and 820 remain fixed (e.g., static) at the same pixel locations among both shifted image frames 800 and 850. However, feature 830 exhibits a shift denoted by arrow 840.

During the SBNUC process of block 360, processor 110 compares the shift exhibited by shifted image frames 800 and 850 with the shift expected to be exhibited by the controlled motion pattern. If a feature of the image frame exhibits a shift corresponding to the expected shift, then the feature may be identified as genuine image information captured from scene 170. However, if a feature of the image exhibits no shift, or a different shift not corresponding to the expected shift, then the feature may be identified as noise (e.g., FPN) that does not correspond to scene 170.

For example, if the controlled motion pattern of block 330 is expected to result in a shift of the entire image frame 800 in the direction of arrow 840, then feature 830 may be deemed to be genuine scene information, while features 810 and 820 may be identified as noise. In this regard, certain types of noise such as FPN may remain relatively static in some cases from frame-to-frame. Because features 810 and 820 did not change despite the physical movement of imaging system 100 relative to scene 170, processor 110 can determine with high confidence that features 810 and 820 correspond to noise.

Referring again to FIG. 3, processor 110 updates correction terms 230 (updates in block 370 of FIG. 3 are provided to block 230 of FIG. 2) to compensate for the noise identified in block 360. Also in FIG. 3, processor 110 may perform a de-warp process (block 380) on the shifted image frames to compensate for the image shifts associated with the controlled motion pattern. As a result, image frames may continue to be processed by image processing pipeline 200 before, during, and after the performance of the controlled motion pattern (e.g., the controlled motion pattern may be transparent to a user).

FIG. 4 illustrates a portion 400 of image processing pipeline 200 which may be provided in block 220 of FIG. 1 to update correction terms 230 using a detected motion pattern in accordance with an embodiment of the disclosure. In block 420, motion sensor 156 detects a motion pattern associated with a movement of imaging system 100 and provides information identifying the detected motion pattern to processor 110. Such a motion pattern may be generated, for example, by a user moving imaging system 100 (e.g., when imaging system 100 is implemented as a handheld camera device), environmental forces (e.g., wind or vibrations), and/or any other controlled or uncontrolled movements.

As similarly discussed with regard to FIG. 3, in some embodiments, the detected motion pattern may be selected such that it is limited to a particular field of view (block 410) of scene 170. For example, in some embodiments, only certain motion patterns may be used such as motion patterns where a subset of scene 170 is present in all image frames captured during the detected motion pattern.

While the motion pattern is detected (block 420), imager 130 continues to capture image frames 210. As a result, image frames 210 will include image frames captured before, during, and after the detected motion pattern occurs.

In block 430, processor 110 performs a motion estimation process. In this regard, processor 110 may compare an image frame captured before the detected motion pattern has occurred with an image frame captured after the detection motion pattern has occurred to estimate the motion pattern exhibited between the image frames.

In block 440, processor 110 performs a motion consistency check by comparing the estimated motion pattern provided by block 430 and the actual motion pattern detected in block 420. If the estimated and detected motion patterns are consistent with each other, then processor 110 may determine that the correction terms 230 are accurate and may not require updating.

However, if the estimated and detected motion patterns are inconsistent with each other (e.g., a discrepancy is identified), then processor 110 may determine that noise exists in the image frames which has caused the motion pattern estimation process of block 430 to be inaccurate. This determination may then trigger processor 110 to perform a SBNUC process (block 460). In this case, processor 110 utilizes the shifted image frames captured during the detected motion pattern (block 450) in a SBNUC process (block 460) to update correction terms 230 (block 470) to compensate for the noise.

In some embodiments, portion 400 of image processing pipeline 200 may also include a block to perform a de-warp process as similarly discussed with regard to FIG. 3 to compensate for the image shifts associated with the detected motion pattern.

Figure 5:
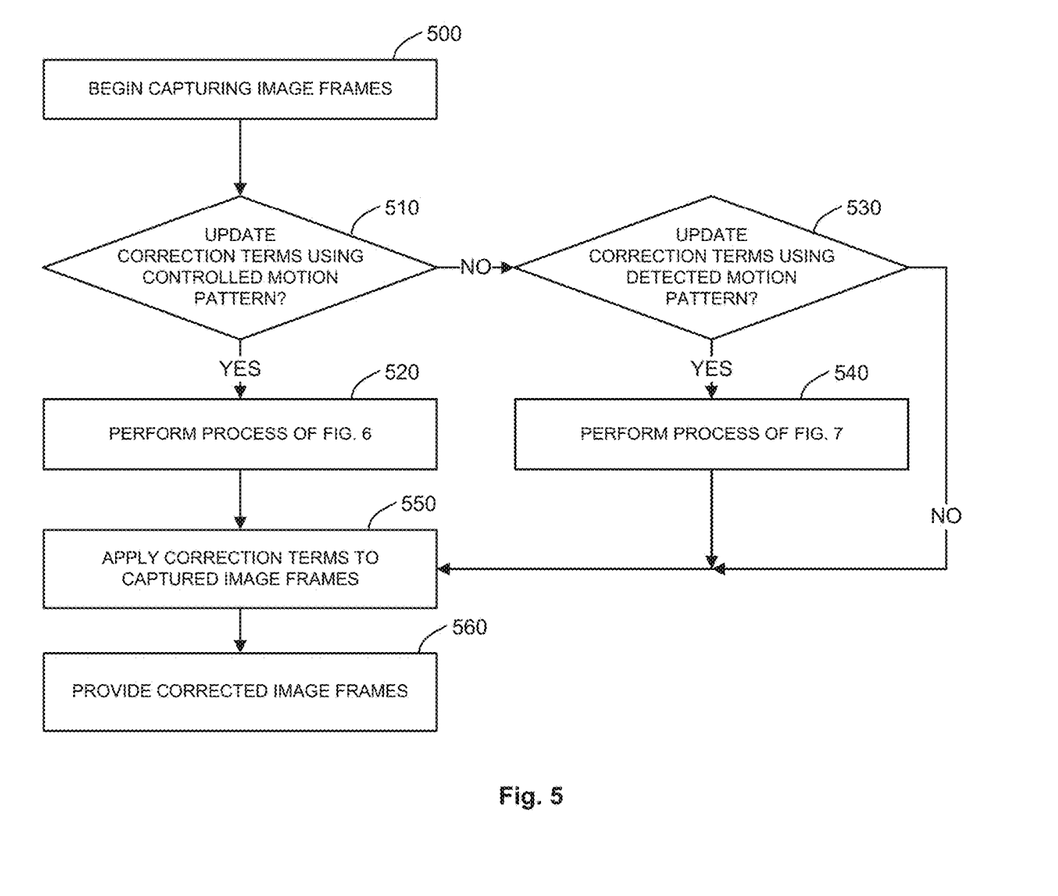
FIG. 5 illustrates a process of applying correction terms in accordance with an embodiment of the disclosure.
Figure 7:
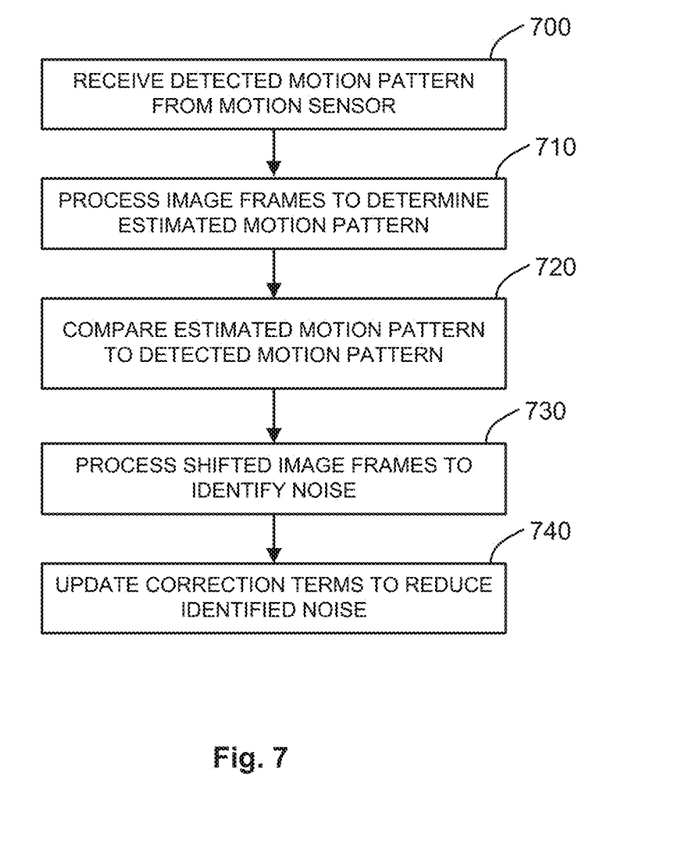
FIG. 7 illustrates a process of updating correction terms using a motion sensor in accordance with an embodiment of the disclosure.

FIGS. 5-7 illustrate various processes that may be performed using the image processing pipeline features of FIGS. 2-4. In this regard, FIG. 5 illustrates a process of applying correction terms 230, FIG. 6 illustrates a process of updating correction terms 230 using pan/tilt platform 162, and FIG. 7 illustrates a process of updating correction terms 230 using motion sensor 156 in accordance with embodiments of the disclosure.

Referring now to FIG. 5, in block 500, imager 130 begins capturing image frames 210 of scene 170. In some embodiments, imager 130 may continue to capture image frames 210 throughout the duration of the processes of FIGS. 5-7 such that a series of image frames 210 continue to be provided to image processing pipeline 200 before, during, and after any motion pattern performed by pan/tilt platform 162 or detected by motion sensor 156. Thus, image frames 210 may include shifted image frames captured during such movements.

In block 510, processor 110 determines whether correction terms 230 should be updated using a controlled motion pattern performed by pan/tilt platform 162 in accordance with portion 300 of image processing pipeline 200 and FIG. 6. For example, in some embodiments, processor 110 may initiate such an update at scheduled times, regular intervals, and/or in response to one or more conditions (e.g., conditions determined from information received by motion sensor 156, other sensors 160, communication interface 152, processing of image frames 210, and/or other sources). If yes, then the process continues to block 520. Otherwise, the process continues to block 530.

In block 520, processor 110 performs the process of FIG. 6 using the various discussed features of portion 300 of image processing pipeline 200. Referring now to FIG. 6, in block 600, processor 110 operates actuators 166 of pan/tilt platform 162 to move imaging system 100 in a controlled motion pattern to captured shifted image frames as discussed. In block 610, processor 110 performs a SBNUC process on the shifted image frames to identify noise as discussed. In block 620, processor 110 updates correction terms 230 to compensate for the identified noise as discussed. In block 630, processor 110 performs a de-warp process on the shifted image frames to compensate for the image shifts associated with the controlled motion pattern as discussed.

Thus, following the process of FIG. 6, correction terms 230 will have been updated to compensate for noise determined using the shifted image frames captured during a controlled motion pattern. In addition, captured images 210 exhibiting image shifts will have been de-warped such that the controlled motion pattern may not be perceived by the user when viewing corrected image frames 250.

Returning to FIG. 2, in block 530, processor 110 determines whether correction terms 230 should be updated in response to a detected motion pattern in accordance with portion 400 of image processing pipeline 200 and FIG. 7. For example, in some embodiments, processor 110 may initiate such an update in response to motion detected by motion sensor 156 in block 530. If yes, then the process continues to block 540. Otherwise, the process continues to block 550.

In block 540, processor 110 performs the process of FIG. 7 using the various discussed features of portion 400 of image processing pipeline 200. Referring now to FIG. 7, in block 700 processor 110 receives information from motion detector 156 identifying a motion detected pattern as discussed. Image frames 210 captured during the motion will be shifted image frames as discussed. In block 710, processor 110 compares an image frame captured before the detected motion pattern occurred with an image frame captured after the detection motion pattern occurred (e.g., a shifted image frame) to estimate the motion pattern exhibited between the image frames as discussed.

In block 720, processor 110 compares the estimated motion pattern determined in block 710 with the detected motion pattern information received in block 700 (e.g., a motion consistency check). If the estimated motion pattern is inconsistent with the detected motion, then this indicates noise may be present in one or more of the image frames which may have caused the inconsistent estimated motion pattern. In this case, processor 110 continues to block 730 and performs a SBNUC process on the shifted image frames to identify noise as discussed. In block 740, processor 110 updates correction terms 230 to compensate for the identified noise.

Thus, following the process of FIG. 7, correction terms 230 will be updated to compensate for noise detected using the shifted image frames captured during a detected motion pattern. In some embodiments, the process of FIG. 7 may further include processor 110 performing a de-warping process as similarly discussed with regard to FIG. 6 such that the detected motion pattern may not be perceived by the user when viewing corrected image frames 250.

Referring again to FIG. 5, in block 550, correction terms 230 are applied to captured images 210 as discussed. In this regard, the correction terms 230 may include any updates provided by the processes of FIG. 6 or 7. In block 560, corrected image frames 250 as provided as discussed.

In view of the present disclosure, it will be appreciated that techniques are provided to update correction terms 230 based on image shifts resulting from controlled motion patterns and/or detected motion patterns. By utilising these techniques without a shutter, an uninterrupted series of captured image frames may be provided to a user while permitting simultaneous updating of correction terms 230. Thus, the quality of image frames can be repeatedly and continuously improved while a user views an imaged scene 170.

Figure 9:
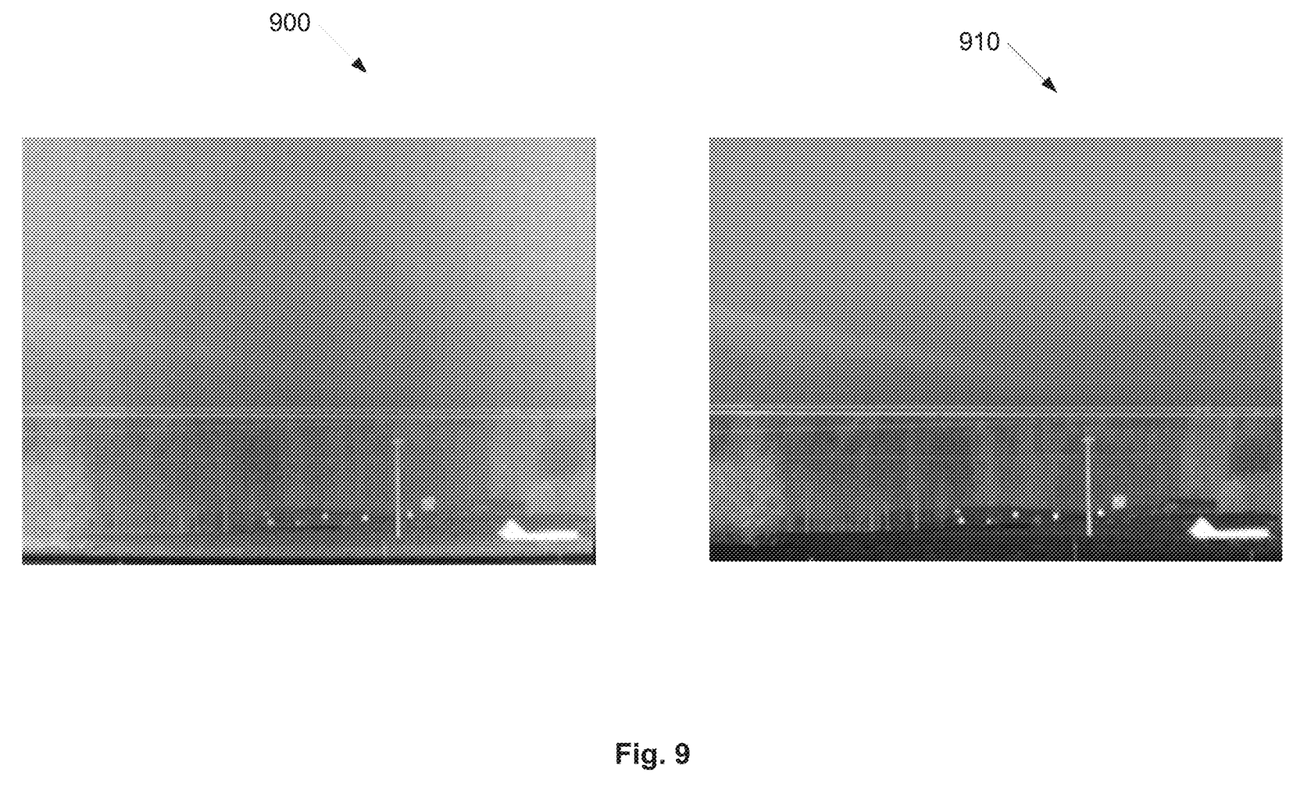
FIG. 9 illustrates an example image frame corrected by a shutter-based process and an example image frame corrected by an image shift-based process in accordance with an embodiment of the disclosure.

Moreover, the techniques discussed herein can provide improved image quality over conventional shutter-based approaches. For example, FIG. 9 illustrates a comparison between an example image frame 900 processed with a conventional shutter-based non-uniformity correction process and an example image frame 910 processed with the techniques discussed with regard to FIGS. 2-7 applied to approximately one hundred captured image frames 210 in accordance with an embodiment of the disclosure. As shown, image frame 910 exhibits less noise such that individual features of the imaged scene 170 are clearer and more discernable than as exhibited by image frame 900.

Where applicable, various embodiments provided by the present disclosure can be implemented using hardware, software, or combinations of hardware and software. Also where applicable, the various hardware components and/or software components set forth herein can be combined into composite components comprising software, hardware, and/ or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
    moving an imager of an imaging system in accordance with a motion pattern;
    capturing, by the imager, a plurality of image frames comprising scene information, wherein the image frames exhibit frame-to-frame shifts of the scene information caused by the motion pattern;
    processing the image frames to distinguish noise in the image frames from the frame-to-frame shifts of the scene information, wherein image frames comprise one or more features each of which is present in at least two of the image frames, and the processing comprises, for each feature of the one or more features, comparing an exhibited shift with an expected shift, wherein:
        the exhibited shift is a shift exhibited by the feature among at least two of the image frames; and
        the expected shift is a shift expected to be exhibited by the feature based on the motion pattern; and
    updating non-uniformity correction terms to reduce the noise.

2. The method of claim 1, wherein the imaging system is attached to a pan/tilt platform, wherein the moving comprises controlling the pan/tilt platform to move in accordance with the motion pattern.

3. The method of claim 1, wherein updating the non-uniformity correction terms to reduce the noise comprises:
for at least one feature of the one or more features, upon determining that the exhibited shift corresponds to the expected shift, identifying the feature as comprising scene information;
for at least one feature of the one or more features, upon determining that the exhibited shift does not correspond to the expected shift, identifying the feature as noise.

4. The method of claim 1, further comprising:
detecting the motion pattern by a motion sensor of the imaging system;
processing the image frames to determine an estimated motion pattern;
comparing the estimated motion pattern and the detected motion pattern; and
wherein the processing the image frames to distinguish noise is performed in response to a discrepancy determined by the comparing.

5. The method of claim 1, further comprising:
detecting the motion pattern by a motion sensor of the imaging system;
wherein the motion pattern is generated by a user manipulation of the imaging system.

6. The method of claim 1, wherein the processing comprises identifying the noise using a static feature which is one of the one or more features and which exhibits no shift among at least two of the image frames.

7. The method of claim 1, further comprising applying the updated non-uniformity correction terms to the image frames.

8. The method of claim 1, further comprising performing a de-warp process on the shifted image frames to reduce the frame-to-frame shifts of the scene information caused by the motion pattern.

9. The method of claim 1, wherein:
the moving comprises moving the imaging system relative to a scene;
the scene information comprises a subset of the scene; and
the method further comprises selecting the motion pattern to maintain an entirety of the scene information in each of the captured images.

10. The method of claim 1, further comprising providing the image frames to a user in an uninterrupted series during the moving.

11. A system comprising:
an imager configured to capture a plurality of image frames comprising scene information, wherein the image frames exhibit frame-to-frame shifts of the scene information caused by a motion pattern associated with the imager; and
a processor configured to:
distinguish noise in the image frames from the frame-to-frame shifts of the scene information, wherein for image frames comprising one or more features each of which is present in at least two of the image frames, distinguishing noise comprises, for each feature of the one or more features, comparing an exhibited shift with an expected shift, wherein:
the exhibited shift is a shift exhibited by the feature among at least two of the image frames; and
the expected shift is a shift expected to be exhibited by the feature based on the motion pattern, and
update non-uniformity correction terms to reduce the noise.

12. The system of claim 11, further comprising a pan/tilt platform, wherein:
the imager is configured to move with the pan/tilt platform; and
the processor is configured to control the pan/tilt platform to move the imager accordance with the motion pattern.

13. The system of claim 11, wherein updating the non-uniformity correction terms to reduce the noise comprises, for at least one feature of the one or more features:
If the exhibited feature shift corresponds to the expected shift, identifying the feature as comprising scene information; and
if the exhibited shift does not correspond to the expected shift, identifying the feature as noise.

14. The system of claim 11, further comprising a motion sensor, wherein the processor is configured to detect the motion pattern by the motion sensor; and
wherein the processor is further configured to:
process the image frames to determine an estimated motion pattern;
compare the estimated motion pattern and the detected motion pattern; and
distinguish the noise in response to a discrepancy determined by the comparing.

15. The system of claim 11, further comprising a motion sensor, wherein the processor is configured to detect the motion pattern by the motion sensor; and
wherein the motion pattern is generated by a user manipulation of the system.

16. The system of claim 11, wherein the processor is configured to identify the noise using a static feature which is one of the one or more features and which exhibits no shift among at least two of the image frames.

17. The system of claim 11, wherein the processor is configured to apply the updated non-uniformity correction terms to the image frames.

18. The system of claim 11, wherein the processor is configured to perform a de-warp process on the shifted image frames to reduce the frame-to-frame shifts of the scene information caused by the motion pattern.

19. The system of claim 11, wherein:
the motion pattern moves the imager relative to a scene;
the scene information comprises a subset of the scene; and
the processor is configured to select the motion pattern to maintain an entirety of the scene information in each of the captured images.

20. The system of claim 11, wherein the processor is configured to provide the image frames to a user in an uninterrupted series while the motion pattern is performed.

* * * * *